(12) United States Patent
Schmidt et al.

(10) Patent No.: US 11,609,338 B2
(45) Date of Patent: Mar. 21, 2023

(54) METHOD AND DEVICE FOR DETECTING INCIDENT LASER RADIATION ON A SPACECRAFT

(71) Applicant: Jena-Optronik GmbH, Jena (DE)

(72) Inventors: Uwe Schmidt, Bürgel (DE); Thorben Haarlammert, Jena (DE)

(73) Assignee: Jena-Optronik GmbH, Jena (DE)

( * ) Notice: Subject to any disclaimer, the term of this patent is extended or adjusted under 35 U.S.C. 154(b) by 270 days.

(21) Appl. No.: 16/803,505

(22) Filed: Feb. 27, 2020

(65) Prior Publication Data
US 2020/0271789 A1  Aug. 27, 2020

(30) Foreign Application Priority Data
Feb. 27, 2019  (DE) .................... 10 2019 105 036.7

(51) Int. Cl.
*G01C 3/08* (2006.01)
*G01S 17/933* (2020.01)
*G01S 7/48* (2006.01)
*G01S 7/4863* (2020.01)

(52) U.S. Cl.
CPC .......... *G01S 17/933* (2013.01); *G01S 7/4804* (2013.01); *G01S 7/4863* (2013.01)

(58) Field of Classification Search
CPC ..... G01S 17/933; G01S 7/4804; G01S 7/4863
See application file for complete search history.

(56) References Cited

U.S. PATENT DOCUMENTS

| 7,683,310 B1* | 3/2010 | Sinclair | G01S 7/4804 |
| | | | 250/216 |
| 2008/0291075 A1* | 11/2008 | Rapanotti | G01S 13/867 |
| | | | 342/20 |
| 2014/0009610 A1 | 1/2014 | Scherbarth et al. | |
| 2017/0343411 A1* | 11/2017 | McNulty | G01J 9/00 |

FOREIGN PATENT DOCUMENTS

| DE | 102007024051 A1 | 11/2008 | |
| EP | 2682777 A1 | 1/2014 | |
| WO | WO 2012130209 A2 * | 10/2012 | ............... G01J 9/00 |

OTHER PUBLICATIONS

European Patent Office; Search Report in related European Patent Application No. 20159439.7 dated Jul. 22, 2020; 8 pages.

* cited by examiner

*Primary Examiner* — Mark Hellner
(74) *Attorney, Agent, or Firm* — Dorton & Willis, LLP

(57) ABSTRACT

A method for detecting incident laser radiation on a spacecraft, whereby incident radiation is detected separately in several discrete spectral ranges, the radiation recorded in the spectral ranges is converted into further processable electrical signals, and the signals are evaluated together. A device for detecting incident laser radiation on a spacecraft is configured to perform such a method.

15 Claims, 3 Drawing Sheets

METHOD AND DEVICE FOR DETECTING INCIDENT LASER RADIATION ON A SPACECRAFT

CROSS-REFERENCE TO RELATED APPLICATIONS

This application claims the benefit of priority under 35 U.S.C. § 119(a) to German Patent Application No. DE 10 2019 105 036.7, filed Feb. 27, 2019), and is related to U.S. patent application Ser. No. 16/803,571, filed Feb. 27, 2020, the disclosures of which are incorporated by reference in their entirety.

Technical Field

The invention relates to a method for detecting incident laser radiation on a spacecraft. The invention also relates to a device for detecting incident laser radiation on a spacecraft.

Background

A method is known from document EP 2 682 777 A1 for detecting pulsed laser radiation with a 2-dimensional resolution of the direction of incidence, wherein a CCD sensor with imaging optics is used for detection in a first signal processing with a sampling frequency of at least 5 kHz, wherein individual images are generated by comparing each pixel of the CCD sensor with a threshold value and wherein the pixel value is stored for further processing only if the respective threshold value is exceeded, wherein it is determined that the signal image thus obtained in the first signal processing is made available to a further image processing with an image frequency of 10 Hz to 500 Hz, wherein, in the further image processing, the signal pixel(s) representing the incident laser radiation is identified from the signal image, wherein the direction of incidence of the laser radiation follows from the position of the signal pixels on the signal image.

Document DE 10 2007 024 051 A1 discloses a device for the detection, localization and tracking of laser radiation sources with a detector which is radiation-sensitive in the image field of an imaging optical system and an electronic signal evaluation connected to the detector, in which a line grating is arranged between the laser radiation source and the optical system that is formed as a diffraction grating. In addition, document DE 10 2007 024 051 A1 discloses a method known for the image processing of images obtained with such a device, the diffraction orders of the stripe grating being imaged in the focal plane of the optics on the detector designed as a flat matrix detector and the electronic signal evaluation associated with the detector being performed in such a way that a distinction can be made between point-shaped and line-shaped luminous points of the diffraction order, with the method comprising the following steps: A search for individual points in the overall image according to local criteria, a search for possible partner points in the image that could belong to a common diffraction pattern, a local differentiation between 1st order points and 0-th order points.

SUMMARY

The object of the invention is to improve a method mentioned above. The invention is also based on the object of structurally and/or functionally improving a device mentioned above.

The object is achieved with a method and a device having the features disclosed herein.

The method can be carried out on a spacecraft. The spacecraft can be a rocket, an artificial satellite, in particular an earth satellite or orbiter, a space probe, a space shuttle, a spaceship, a spacecraft, a space capsule or a space station. The process can be carried out in space. The incident laser radiation can be laser radiation directed from the earth or from another spacecraft onto the spacecraft. The incident laser radiation can be laser radiation directed at the spacecraft with a cooperative or hostile intent. The incident laser radiation can be a satellite laser ranging laser radiation. The incident laser radiation can be a measuring laser radiation. The incident laser radiation can be a laser radiation with comparatively low power, which is directed onto the spacecraft prior to a main laser radiation with higher power. The incident laser radiation can be in a wavelength range from approx. 400 nm to approx. 1700 nm. The detection of the incident laser radiation can comprise a local determination of an associated laser source, a determination of a wavelength of the incident laser radiation, a determination of a time characteristic of the incident laser radiation, a determination of a laser power, a processing of detected signals and/or a determination of a measurement time of the laser source.

The incident radiation can comprise the laser radiation and/or further radiation from the electromagnetic spectrum. The further radiation can comprise non-ionizing radiation, in particular optical radiation, in particular infrared radiation, visible radiation and/or ultraviolet radiation. The further radiation can comprise sunlight and/or moonlight.

The incident radiation can be channeled. The incident radiation can be recorded in several separate channels. The channels can be parallel to each other. The spectral ranges and the channels can be assigned to one another. A channel can be assigned to each spectral range. A spectral range can be assigned to each channel. The incident radiation can be detected separately in at least two, in particular in two to eight, in particular in four, discrete spectral ranges. The incident radiation can be recorded in parallel across the spectral ranges. The radiation detected in the spectral ranges can be converted separately into further processable electrical signals for each spectral range. The radiation detected in the spectral ranges can be converted into electrical signals that can be processed further in parallel to the spectral ranges.

The multiple discrete spectral ranges can be recorded in separate channels. A number of channels can correspond to a number of discrete spectral ranges. The radiation detected in the spectral ranges can be converted into further processable electrical signals in the separate channels.

The incident radiation can be detected in at least one narrowband spectral range, in particular in two narrowband spectral ranges. The at least one narrowband spectral range can be tuned to a specific laser frequency. The at least one narrowband spectral range can be tuned to a wavelength of 532 nm, 1055 nm, 1064 nm, 1070 nm, 1315 nm and/or 1550 nm.

The incident radiation can be detected in at least one broadband spectral range, in particular in two broadband spectral ranges. The at least one broadband spectral range can be tuned to cover the optical spectrum. The at least one broadband spectral range can be tuned to cover a wavelength range from approximately 400 nm to approximately 1700 nm.

The electrical signals from the spectral ranges that can be further processed can be combined. The signals can be evaluated together either structurally or functionally. The signals can be centrally evaluated, input, processed, prepared and/or made available.

With the help of a synchronization signal, measurement times can be marked and/or made available. The synchronization signal can be an internal or external synchronization signal.

A measurement rate can be adapted to characterize pulsed laser radiation. The pulsed laser radiation can be characterized in terms of its temporal properties. The measurement rate can, for example, be adapted to approx. 10 Hz up to approx. 50 Hz, in particular approx. 30 Hz.

The incident radiation can be separately filtered in the spectral ranges. A specifically adapted filter, such as spectral and/or transmission filters, can be applied in each spectral range. The spectral and/or transmission filters can be adapted in order to be able to determine the wavelength and laser power for the spectral ranges or in the channels with sensors of the same type.

The incident radiation can be imaged in the spectral ranges on several pixels of a pixel matrix detector. The multiple pixels can form a cluster. This means that an actual signal can be distinguished on the basis of faulty signals caused by faulty pixels.

Pulsed laser radiation can be detected using asynchronous laser pulse detection. This asynchronous laser pulse detection can also be referred to as a laser "see-spot" Advanced Laser Phosphor Display (ALPD). A continuous laser radiation can be recorded in an imaging mode.

Space-specific stray light sources such as the sun and/or the moon can be distinguished. The distinction between space-specific stray light sources can be achieved by a plausibility between the spectral ranges if laser sources excite only one spectral range/channel and broadband stray light sources excite several spectral ranges/channels.

A thermal household can be regulated by means of radiators. The radiators can be attached on the outside. The radiators can be thermally isolated to form an interface.

The incident radiation can be separated using a beam splitter module for a separate detection in the spectral ranges/channels. The incident radiation can be fed to the beam splitter module. With the help of the beam splitter module, the incident radiation can be divided into the spectral ranges.

The device can be used for arrangement on a spacecraft. The device can also be referred to as a laser warning. The device can comprise a single optical module. The optical module can comprise a light diaphragm to reduce light scatter. The optical module can comprise a lens, in particular a wide-angle lens. The optical module can comprise a beam splitter module for separating the incident radiation into the spectral ranges. The beam splitter module can have a first beam splitter and two second beam splitters.

The device can comprise at least one optical sensor for each spectral range. The at least one optical sensor can be a pixel detector, in particular a pixel matrix detector, for example with a resolution of 1280×1024 pixels. The at least one optical sensor can be an infrared sensor, in particular a Short Wave Infrared (SWIR) sensor. The device can have a single evaluation device for a joint evaluation of the signals.

The method can be carried out by using a camera system for detecting laser beams comprising a beam splitter and a plurality of detectors. With the help of the detectors, a spectral range from approx. 400 nm to approx. 1700 nm can be discretely coverable. The camera system can comprise a first detector, a second detector, a third detector and/or a fourth detector. The first detector can cover the spectral range 532 nm, the second detector can cover the spectral ranges 1055 nm, 1064 nm, 1070 nm, the third detector can cover the spectral range 1315 nm and/or the fourth detector can cover the spectral range 1550 nm. Control and readout electronics can be assigned to each detector. The camera system can comprise a data processor. The camera system can comprise a data interface.

To summarize, and in other words, the invention results in a laser warning system on board a spacecraft for the detection of laser sources on the ground and in space.

An imaging system can be configured by NIS (Nitrogen Indices) . . . SWIR in a spectral broadband manner. The imaging system may comprise optics and a detector. A laser wavelength (range and/or spectral line) can be determined by dividing a beam path into spectral ranges (channels) with a beam splitter. Spectral channel data can be input and processed and measurement data can be prepared and made available in a common computing unit. An exact measurement time of the laser source can be marked and made available by means of an internal or external synchronization signal. An adapted measuring rate can be designed to characterize pulsed laser radiation with regard to its temporal properties (e.g. 30 Hz). To determine a wavelength (band and/or spectral line) and a laser power with a detector of the same design per channel, an adapted spectral and transmission filter can be applied per channel. A division into dedicated channels is more cost-effective than a traditional broadband spectrometer solution. The laser source can be imaged on a pixel matrix detector in a wide-angle field of view in such a way that a laser power received by the optics is imaged on several pixels (clusters). This property of the image can be used to distinguish an actual signal from white pixels. A laser "see-spot" ALPD property of a detector can be used to detect pulsed laser sources. Continuous laser radiation can be detected in an imaging mode of the detector. A differentiation of space-specific interference light sources, such as the sun/moon, can be achieved with the plausibility between the spectral ranges if laser sources excite only one channel and broadband emitters such as the sun/moon excite several channels. To regulate a thermal household, radiators with a mechanically designed optical head can be attached to external surfaces. The optical head can therefore work thermally isolated from a satellite interface.

The invention achieves an adaptation to specific environmental conditions in space, in particular in space close to the earth. Broadband radiometric laser characterization is made possible. A quantitative signal and power measurement is made possible. In a broadband range of Visible (VIS) . . . Near Infrared (NIR) SWIR (500 nm . . . 1700 nm) laser sources can be detected. Location coordinates (angles) of the laser source can be determined in a wide field of view (e.g. +/−60 degrees). A wavelength of a detected laser source (range and/or spectral line) can be determined. A temporal laser characteristic (continuous . . . pulsed, pulse frequency) can be determined. Laser power (radiometry) can be determined. Detected signals can be processed, a laser characteristic can be processed and sent to a higher-level system via a data interface. A precise measurement time of the laser source can be determined by means of internal or external synchronization to assist with the determination of the location and directional connection in the presence of the specific orbit movement dynamics of the spacecraft.

A detector can be used which enables the identification of pulsed laser radiation. In addition to the evaluation of the laser pulses, a high intensity of the lasers at the location of the laser warning can also be used as a criterion. By using several channels, each of which can be assigned to a fixed spectrum of light, background interference light sources (sun, moon) can be identified. The imaging method can achieve an angular resolution. Spectral selection (measurement of the wavelength of the laser) can be carried out using dielectric filters in a beam splitter.

Due to the use of several spectrally selective channels, which are evaluated in a common electronic unit, stray light sources such as the sun or the moon can be identified and excluded as a laser source. This allows the identification of laser radiation based on the intensity in combination with its spectral narrowband (a laser will only ever be detected in one channel). A beam splitter can be used for the spectral separation of several channels. A compensation filter (transmission filter+spectral filter in a filter layer system) can be used to compensate for a wavelength-dependent detector sensitivity in the intensity measurement in the spectral ranges when using the same detector type per channel. This filter can ensure that laser sources of all wavelengths generate the same signal level in the detector pixels with the same power. For this purpose, effects in the light transmission (e.g. in a lens) as well as in signal processing (e.g. quantum efficiency of the detector) can be compensated for. This filter allows a much more precise determination of the power of the laser radiation than what is possible with conventional systems.

Exemplary embodiments of the invention are described in more detail below with reference to figures.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
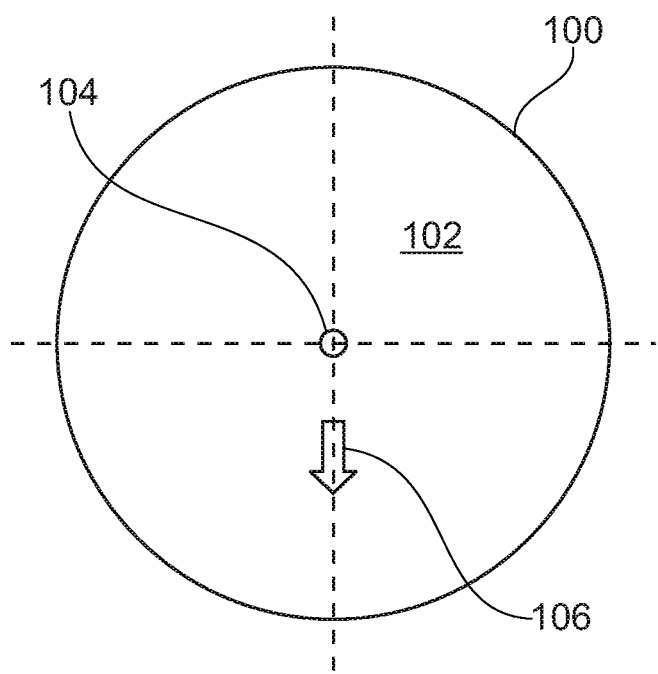
FIG. 1 schematically illustrates a laser warning field of view for detecting incident laser radiation on a spacecraft.

FIG. 1 shows a laser warning field of view 100 for detecting incident laser radiation. The laser detector is arranged on a spacecraft, in particular on an earth satellite, and is used to detect measuring laser radiation directed from the earth 102 onto the spacecraft, in particular in a wavelength range from approximately 400 nm to approximately 1700 nm. The laser warning field of view 100 extends at least approximately circularly around a nadir 104 of the spacecraft and makes a 4Pi or 360° monitoring possible. A flight direction of the spacecraft is designated by 106. For further monitoring, additional laser detectors of this type can be provided whose field of vision is directed, for example, into space.

Figure 2:
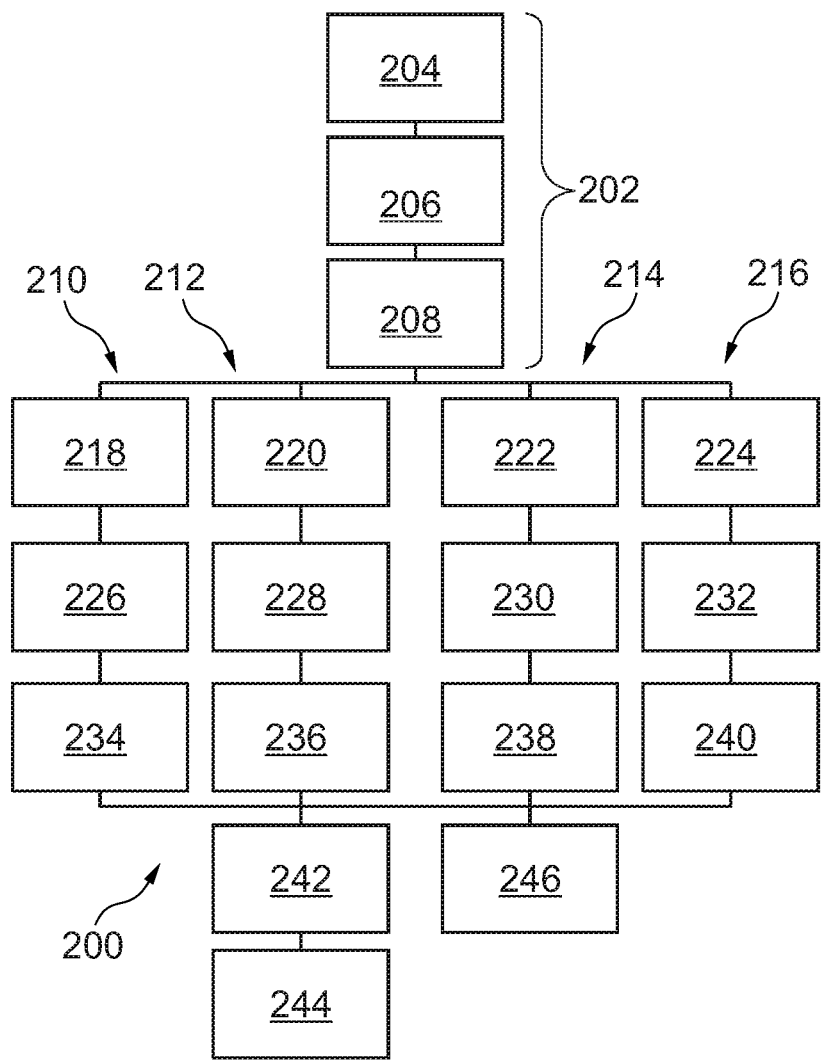
FIG. 2 illustrates an exemplary diagram for a laser detector with a single optical module with a beam splitter module for separating incident radiation into four spectral ranges or channels, an optical sensor for each spectral range or channel and a single evaluation device.

FIG. 2 shows a laser detector 200 with a single optical module 202 with a light diaphragm 204, optics 206 and a beam splitter module 208. The light shield 204 serves to reduce light scatter. The optics 206 comprises a wide-angle lens. The beam splitter module 208 comprises a first beam splitter and two second beam splitters and serves to split incident radiation into four discrete spectral ranges or channels 210, 212, 214, 216. The incident radiation comprises radiation from the electromagnetic spectrum, in particular non-ionizing radiation, in particular optical radiation, in particular infrared radiation, visible radiation and/or ultraviolet radiation, for example sunlight, moonlight and/or laser radiation to be detected. The incident radiation is, for example, divided into two broadband spectral ranges for covering the optical spectrum with a wavelength range from approx. 400 nm to approx. 1700 nm and into two narrowband spectral ranges for detecting laser radiation with the wavelengths 532 nm, 1055 nm, 1064 nm, 1070 nm, 1315 nm and/or 1550 nm.

The channels 210, 212, 214, 216 are matched to the spectral range. Two channels 210, 212 on the broadband spectral ranges for covering the optical spectrum with a wavelength range from approx. 400 nm to approx. 1700 nm and two channels 214, 216 on the narrowband spectral ranges for detecting laser radiation with the wavelengths 532 nm, 1055 nm, 1064 nm, 1070 nm, 1315 nm and/or 1550 nm are matched. In the channels 210, 212, 214, 216, the divided radiation is supplied via the bandpass filters 218, 220, 222, 224 to the sensors 226, 228, 230, 232 for a separate detection in the spectral ranges. The bandpass filters 218, 220, 222, 224 each have spectral and/or transmission filters for compensation purposes in order to use sensors 226, 228, 230, 232 of the same type. The sensors 226, 228, 230, 232 serve to convert the radiation detected in the spectral ranges into electrical signals that can be processed further. VIS-SWIR InGaAs detectors are used as sensors 226, 228, 230, 232, for example, which cover a required wavelength range with a local resolution of 1280×1024 picture elements and for which each 2×2 macro-pixel has a special circuit for the detection of pulsed laser radiation, which detects very fast light signal changes (ALPD function). Control and readout electronics 234, 236, 238, 240 are connected downstream from each of the sensors 226, 228, 230, 232.

The laser detector 200 comprises a single evaluation device 242 for the joint evaluation of the signals from the sensors 226, 228, 230, 232, a signal interface 244 for the signal output and a power supply 246.

Figure 3:
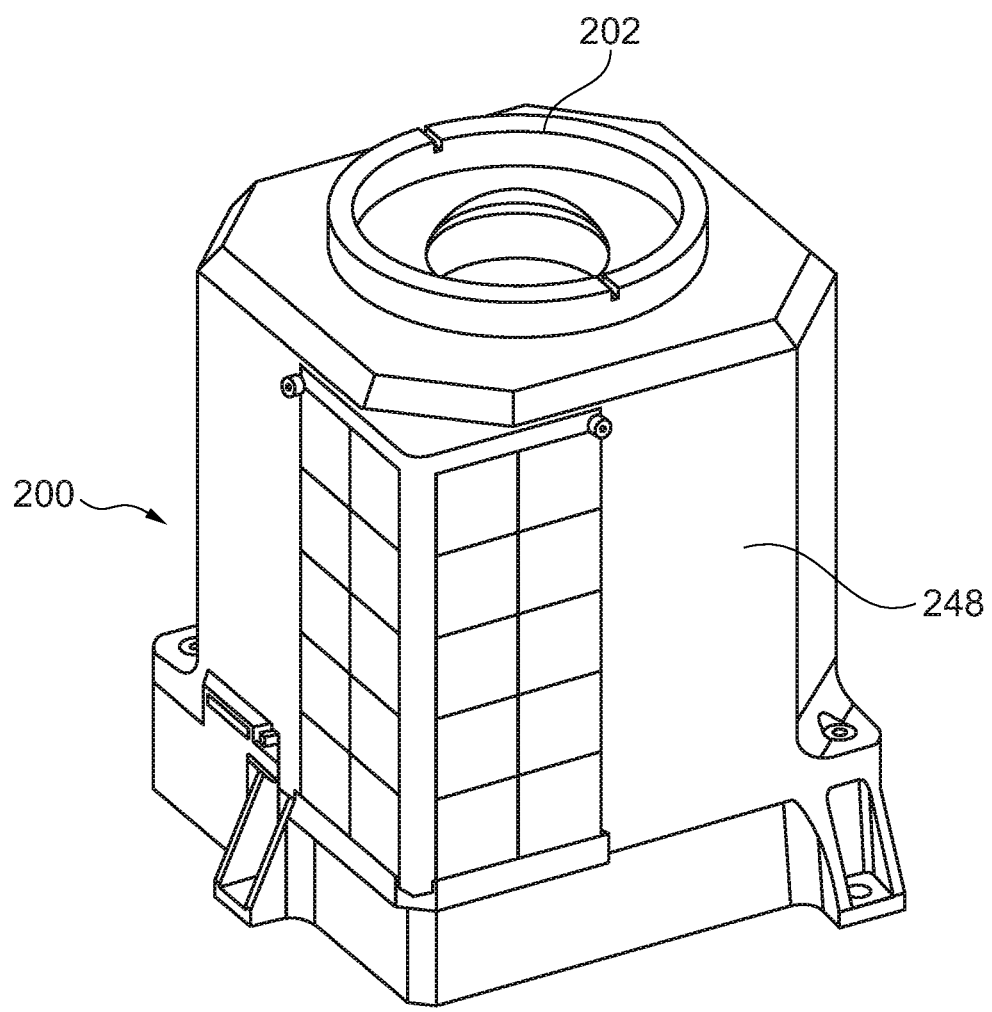
FIG. 3 depicts a mechanical construction of a laser detector with a single optical module with a beam splitter module for separating incident radiation into four spectral ranges or channels, an optical sensor for each spectral range or channel and a single evaluation device.

FIG. 3 shows a mechanical construction of the laser warning device 200 with the optical module 202 with a beam splitter module for separating the incident radiation into the four discrete spectral ranges or channels. An outer casing 248 of the laser detector 200 is provided with radiators in order to control a heat balance in space.

The word "can" refers in particular to optional features of the invention. Accordingly, there are further developments and/or exemplary embodiments of the invention as well which additionally or alternatively comprise the respective feature or the respective features.

If necessary, isolated features can also be selected from the combinations of features disclosed and can be used in combination with other features to delimit the subject matter of the claim, while resolving a structural and/or functional relationship that may exist between the features.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

REFERENCE NUMERALS

100 Laser detector field of view
102 Earth
104 Nadir
106 Direction of flight
200 Laser detector
202 Optical module
204 Light shield
206 Optics
208 Beam splitter module
210 Channel
212 Channel
214 Channel
216 Channel
218 Bandpass filter
220 Bandpass filter
222 Bandpass filter
224 Bandpass filter
226 Sensor
228 Sensor
230 Sensor
232 Sensor
234 Readout electronics
236 Readout electronics
238 Readout electronics
240 Readout electronics
242 Evaluation device
244 Signal interface
246 Power supply
248 Outer casing

What is claimed is:

1. A method for detecting incident laser radiation on a spacecraft, the method comprising:
   separately recording the incident radiation in spectral ranges, the spectral ranges including (i) several discrete, narrowband spectral ranges, and (ii) at least one broadband spectral range including at least two of the narrowband spectral ranges;
   converting the radiation recorded in the spectral ranges into further processable electrical signals;
   evaluating the electrical signals together; and
   separately imaging the incident radiation in each of the spectral ranges on a plurality of pixels of a respective pixel matrix detector.

2. The method of claim 1, further comprising:
   tuning at least one of the narrowband spectral ranges to a specific laser frequency.

3. The method of claim 2, wherein at least one of the narrowband spectral ranges is tuned to a wavelength of 532 nm, 1055 nm, 1064 nm, 1070 nm, 1315 nm or 1550 nm.

4. The method of claim 1, further comprising:
   tuning the at least one broadband spectral range so that it covers the optical spectrum.

5. The method of claim 4, wherein the at least one broadband spectral range is tuned to cover a wavelength range from approximately 400 nm to approximately 1700 nm.

6. The method of claim 1, further comprising at least one of:
   centrally inputting the electrical signals;
   processing the electrical signals;
   preparing the electrical signals; or
   making the electrical signals available.

7. The method of claim 1, further comprising at least one of:
   marking the measurement times using a synchronization signal; or
   making the measurement times available using a synchronization signal.

8. The method of claim 1,
   wherein the separately recording the incident radiation operation is performed at a measuring rate; and
   wherein the method further comprises adapting the measuring rate for characterizing the incident radiation comprising a pulsed laser radiation.

9. The method of claim 1, further comprising:
   separately compensation-filtering the incident radiation in the spectral ranges so that an incident laser radiation of a given power generates a substantially constant electrical signal level regardless of wavelength.

10. The method of claim 1, further comprising at least one of:
    detecting the incident radiation including pulsed laser radiation using an asynchronous laser pulse detection mode; or
    detecting the incident radiation including continuous laser radiation using an imaging mode.

11. The method of claim 1, further comprising:
    distinguishing space-specific stray light sources from a laser light source by assessing whether the incident radiation excites more than one of the narrowband spectral ranges.

12. The method of claim 1, wherein the incident radiation is separated into the narrowband spectral ranges using a beam splitter module so the individual narrowband spectral ranges of the incident radiation can be separately detected by respective sensors associated with individual ones of the narrowband spectral ranges.

13. A device for detecting incident laser radiation on a spacecraft, wherein the device is configured to perform the method according to claim 1.

14. The device of claim 13, comprising:
    a single optical module with a beam splitter module configured to separate the incident radiation into the spectral ranges;
    at least one optical sensor for each spectral range; and
    a single evaluation device configured for the joint evaluation of the electrical signals.

15. The device of claim 14, wherein the beam splitter module comprises a first beam splitter and two second beam splitters.

* * * * *